A. F. MILLAN.
WATER HEATER.
APPLICATION FILED APR. 3, 1909.
951,215.
Patented Mar. 8, 1910.
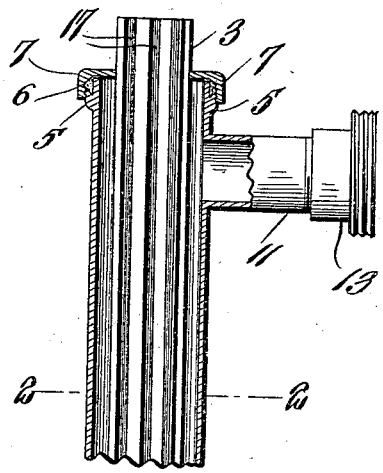
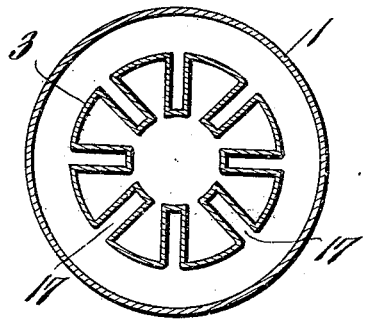
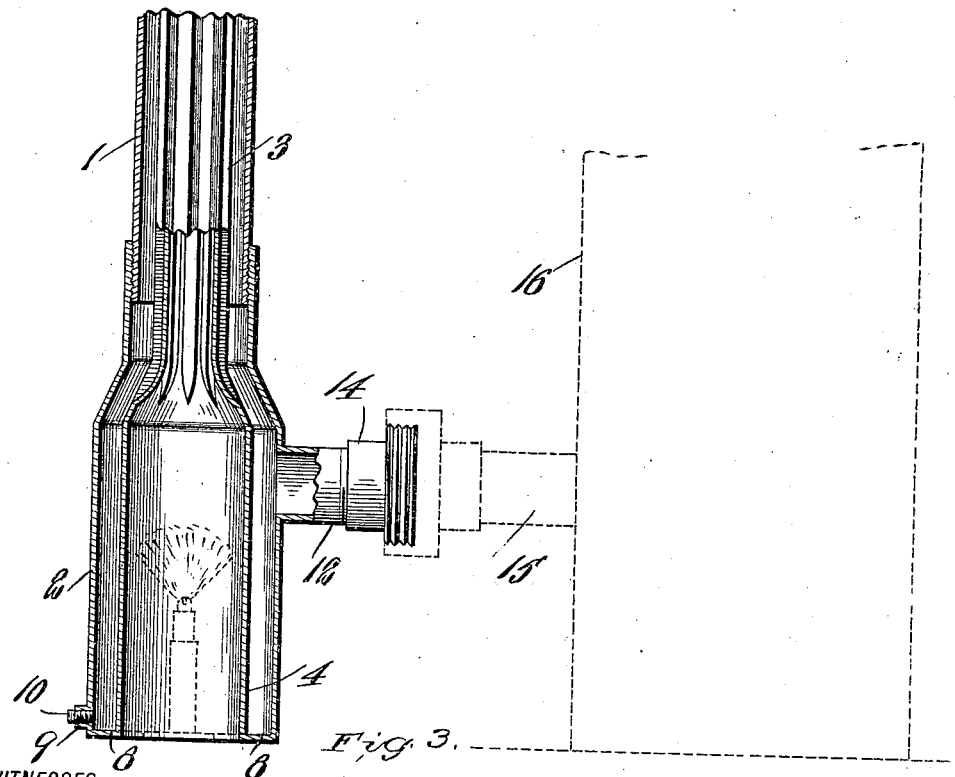
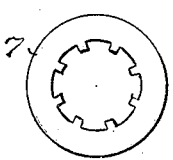
WITNESSES
E. M. Callaghan
C. E. Trainor
INVENTOR
ALPHEUS F. MILLAN
BY Munn & Co.
ATTORNEYS

UNITED STATES PATENT OFFICE.

ALPHEUS F. MILLAN, OF MANNINGTON, WEST VIRGINIA.

WATER-HEATER.

951,215.  Specification of Letters Patent.  Patented Mar. 8, 1910.

Application filed April 3, 1909. Serial No. 487,623.

*To all whom it may concern:*

Be it known that I, ALPHEUS F. MILLAN, a citizen of the United States, and a resident of Mannington, in the county of Marion and State of West Virginia, have made certain new and useful Improvements in Water-Heaters, of which the following is a specification.

My invention is an improvement in heaters, and consists in certain novel constructions and combinations of parts hereinafter described and claimed.

Referring to the drawings forming a part hereof, Figure 1 is a longitudinal section of the heater, Fig. 2 is a section on the line 2—2 of Fig. 1, and Fig. 3 is a top plan view of the ring closing the top of the heater.

The present embodiment of the invention comprises an outer shell or casing 1 substantially cylindrical in cross section, and an inner shell or casing 3 arranged within and concentric with the outer shell, and of lesser diameter, so that an annular space is formed between the two shells.

The outer shell consists of two sections, an upper section of equal cross section throughout, and a lower section threaded or otherwise attached onto the upper section, and provided at its lower end with an enlargement 2, and the inner shell is also provided with an enlargement 4. The upper end of the outer shell is provided with an annular rib 5, whose peripheral surface is threaded, and whose upper face is inclined downwardly and inwardly to receive a packing 6, and a ring 7, having a central opening through which passes the inner shell, is provided with an annular internally threaded flange 7 for engaging the rib, to retain the packing in place and to close the space between the shells.

A ring 8 which may be integral with the outer casing, closes the space between the shells at the bottom thereof, and a nipple 9 is provided in the outer shell into which a plug 10 is threaded, the plug being removable to permit of draining the space between the shells.

Nipples 11 and 12 are arranged in the outer shell near each end thereof, the nipples being threaded and engaged by unions 13, 14, which are designed to connect the shell with nipples 15, only one of which is shown, on a tank or reservoir 16.

The upper portion of the inner shell is deeply corrugated as shown at 17, more particularly in Fig. 2. The corrugations may be made of any depth (depending on the fuel used) that will not interfere with a free draft and perfect combustion of the fuel. If gas is used I prefer to make them approximately equal to half the length of the radius of the shell. The walls of the corrugations are parallel, and are spaced apart slightly from each other for a purpose to be presently described.

The inner casing 3 is open at both ends, as shown in Fig. 1, and the heating means, which may be of any type desired, is arranged within the lower enlarged portion of the inner casing, the heat and products of combustion passing upward through the shell through space 18 as shown in Fig. 2, and being discharged at the top of the shell.

In operation, the water or other liquid or gas to be heated passes into the annular space between the shell, through the nipple 12 which is the inlet, and as it becomes heated arises, and passes into narrow space between the upper part of the inner and outer shells and the corrugations 17, which divide it into a number of thin sheets, in contact on three sides with the heated metal of the walls of the corrugations. The heat is also divided into thin sheets, so that such sheet of liquid or gas is sandwiched between two sheets of heat and on account of the depth of the corrugations, the sheets are of considerable width, so that practically all of the heat is given up by the products of combustion before they pass out at the top of the heater. The heated liquid passes over through the outlet nipple 11 to the upper part of the tank, so that the circulation is continuous, as long as the heating means is in operation. The fluid in the heater is at all times divided into a thin sheet, since the space between the casings is of small thickness or diameter, and at the upper part of the heater it is subdivided into still thinner sheets, to more effectually absorb the heat, by bringing the fluid into more intimate contact with the heated metal. The heated gas or products of combustion is also at all times divided into thin sheets and on account of the corrugations in the inner tubes is brought into close contact with a larger surface of the metal which holds the fluid to be heated. So that practically all the heat is given up by the products of combustion before they pass out at the top of the heater.

I claim:—

1. A heater comprising inner and outer shells spaced apart to form an annular space therebetween, each of said shells being enlarged at its lower end, one of said shells having at its lower end an integral flange closing the space between the shells, the outer shell having an annular externally threaded rib near its upper end, a ring encircling the inner shell and having a flange threaded on to the rib and closing the space between the shells, said rib being undercut on its upper face, and a packing arranged between said upper face and the flange, said outer shell having at its lower end an inlet and at its upper end an outlet for the purpose set forth, the inner shell having its upper end above the enlargement deeply corrugated, substantially as and for the purpose set forth.

2. A heater comprising inner and outer shells spaced apart to form an annular space therebetween, each of said shells being enlarged at its lower end, one of said shells having at its lower end an integral flange closing the space between the shells, the outer shell having an annular externally threaded rib near its upper end, a ring encircling the inner shell and having a flange threaded on to the rib and closing the space between the shells, said rib being undercut on its upper face, and a packing arranged between said upper face and the flange, said outer shell having at its lower end an inlet and at its upper end an outlet for the purpose set forth, the inner shell having its upper end above the enlargement deeply corrugated, substantially as and for the purpose set forth, said outer shell consisting of upper and lower sections, one of which is threaded into the other.

ALPHEUS F. MILLAN.

Witnesses:
 JESSE A. MASON,
 C. L. HAWKER.